United States Patent
Asami et al.

(10) Patent No.: US 6,343,252 B1
(45) Date of Patent: Jan. 29, 2002

(54) DRIVE POWER CONTROL APPARATUS FOR HYBRID VEHICLE

(75) Inventors: Kiyoshi Asami; Shigeru Ibaraki; Makoto Kishida, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/645,035

(22) Filed: Aug. 24, 2000

(30) Foreign Application Priority Data

Aug. 26, 1999 (JP) ............................................. 11-240591
Jun. 27, 2000 (JP) ........................................ 2000-193254

(51) Int. Cl.$^7$ ................................................. B60K 6/04
(52) U.S. Cl. ........................... 701/113; 701/22; 60/284; 60/285; 180/65.2
(58) Field of Search ................................. 701/111, 113, 701/22; 60/284, 285; 180/65.2, 65.4

(56) References Cited

U.S. PATENT DOCUMENTS 5,984,033 A * 11/1999 Tamagawa et al. ......... 180/65.2

* cited by examiner

*Primary Examiner*—Andrew M. Dolinar
(74) *Attorney, Agent, or Firm*—Armstrong, Westerman, Hattori, McLeland, & Naughton, LLP

(57) ABSTRACT

The hybrid vehicle of the present invention has an internal combustion engine, a power storage unit for storing electric power, and a motor driven by the electric power stored in the power storage unit, the hybrid vehicle being driven by at least one of the outputs from the internal combustion engine and the motor. The drive power control apparatus comprises: a detector for detecting variations in torque produced by the internal combustion engine; a converter for converting the variation into an output from the motor, based on the detection result of the detector; a remaining charge detector for detecting remaining charge of the power storage unit or a value relating to the same; a comparison circuit for comparing the detection result from the remaining charge detector with a preset remaining charge reference value or a value relating to the same; and a controller for driving the motor, based on the output from the converter, when warming up the catalyst by retarding the ignition timing of the internal combustion engine, and when it is determined, based on the output from the comparison circuit, that the detection result from the remaining charge detector is equal to or above the remaining charge reference value or the value relating to the same.

6 Claims, 4 Drawing Sheets

DRIVE POWER CONTROL APPARATUS FOR HYBRID VEHICLE

BACKGROUND OF THE INVENTION

1. Field of the Invention

The present invention relates to a drive power control apparatus for a hybrid vehicle, and in particular, a technique for compensating the variations in drive power caused by ignition timing control of the engine to warm up the engine and a catalyst.

This application is based on Japanese Patent Application Nos. Hei 11-240591, and Hei 2000-193254, the contents of which are incorporated herein by reference.

2. Description of the Related Art

To quickly warm the engine and catalyst, a conventional fuel injection controller for an internal combustion engine retards the ignition timing by a predetermined angle (retarding control) from the time of starting the engine until a predetermined time has passed, or from the time of starting the engine until the water in the engine reaches a predetermined temperature. This increases the temperatures of the exhaust gas and the catalyst, allowing the cleaning of the exhaust gas by the catalyst to be sufficiently effective.

However, when the above-mentioned technique retards the ignition timing, the drivability may be deteriorated, particularly at low speeds. To solve this problem, a technique has been proposed wherein the amount of fuel to be injected from the injector is increased when the ignition timing is retarded by more than a predetermined value. This technique ensures good drivability, and corrects torque without an operation of an accelerator pedal.

However, according to the above-mentioned technique, when increasing the amount of injected fuel while retarding the ignition timing, the fuel consumption and the amount of exhaust gas may be increased.

BRIEF SUMMARY OF THE INVENTION

It is therefore an object of the present invention to provide a drive power control apparatus for a hybrid vehicle which reduces variations in torque when controlling an ignition timing to warm the engine and catalyst, while preventing an increase in the fuel consumption.

In the first aspect of the present invention, the drive power control apparatus for a hybrid vehicle having an internal combustion engine (E), a power storage unit (21) for storing electric power, and a motor (MTRb13) driven by the electric power stored in the power storage unit, the hybrid vehicle being driven by at least one of the outputs from the internal combustion engine and the motor, the drive power control apparatus comprises: a detector (torque variation sensor 25) for detecting a variation in torque produced by the internal combustion engine; a converter (control circuit 18) for converting the variation into an output from the motor, based on the detection result of the detector; a remaining charge detector (voltage sensor 22) for detecting remaining charge of the power storage unit or a value relating to the same; a comparison circuit (control circuit 18) for comparing the detection result from the remaining charge detector with a preset remaining charge reference value or a value relating to the same; and a controller (control circuit 18) for driving the motor, based on the output from the converter, when warming up the catalyst by retarding the ignition timing of the internal combustion engine, and when it is determined, based on the output from the comparison circuit, that the detection result from the remaining charge detector is equal to or above the remaining charge reference value or a value relating to the same.

When retarding the ignition timing of the internal combustion engine to warm up the catalyst, the remaining charge of the power storage unit or a value relating to the same is detected, and the variation in the torque of the internal combustion engine caused by the retardation of the ignition timing is measured. Then, the detected remaining charge or the value relating to the same is compared with the remaining charge reference value or the value relating to the same. When the detection result is equal to or above the remaining charge reference value or the value relating to the same, the amount to be output from the motor is calculated, based on the variation in the torque from the internal combustion engine. Because the motor is driven based on this calculated amount, the variation in torque from the internal combustion engine due to the retardation of the ignition timing can be corrected. Thus, variations in the torque can be suppressed, and smooth driving can be achieved.

In the second aspect of the present invention, the control by the controller is performed until a preset time has passed, when warming up the catalyst by retarding the ignition timing of the internal combustion engine.

After the time of starting the internal combustion engine until the preset time has passed, the drive power control is performed (e.g., according to a timer 40). Therefore, the drive power control is easily executed, and the costs can be reduced.

In the third aspect of the present invention, the drive power control apparatus for a hybrid vehicle having an internal combustion engine (E), a power storage unit (21) for storing electric power, and a motor (MTRb13) driven by the electric power stored in the power storage unit, the hybrid vehicle being driven by at least one of the outputs from the internal combustion engine and the motor, the drive power control apparatus comprises: a detector (torque variation sensor 25) for detecting variations in the torque produced by the internal combustion engine; a converter (control circuit 18) for converting the variation into an output from the motor, based on the detection result of the detector; a remaining charge detector (voltage sensor 22) for detecting the remaining charge of the power storage unit or a value relating to the same; a first comparison circuit (control circuit 18) for comparing the detection result from the remaining charge detector with a preset remaining charge reference value or a value relating to the same; a data detector (water temperature sensor 23, or catalyst temperature sensor 32) for detecting data corresponding to the temperature of the catalyst; a second comparison circuit (control circuit 18) for comparing the detection result from the data detector with a preset reference value; and a controller (control circuit 18) for driving the motor, based on the output from the converter, when warming up the catalyst by retarding the ignition timing of the internal combustion engine, when it is determined, based on the output from the comparison circuit, that the detection result from the remaining charge detector is equal to or above the remaining charge reference value or a value relating to the same, and when the detection result from the data detector is equal to or below the reference value.

The catalyst temperature, and the remaining charge of the power storage unit are detected. When the data relating to the catalyst temperature is equal to or below the reference value, and when the detection result relating to the remaining charge is above the remaining charge reference value or a reference value relating to the same, the torque of the internal combustion engine which varies because of the retardation of the ignition timing is detected by the torque variation sensor. Based on the detection result by the torque variation sensor, the amount of power to be output from the motor is calculated. The motor is driven, based on the calculated amount. Thus, the variations in the torque of the internal combustion engine due to the retardation of the ignition timing can be corrected, and can be suppressed when warming up the catalyst.

In the fourth aspect of the present invention, the data detector (timer 41) counts a preset time, and outputs that the detection result is greater than the reference value.

The elapsed time which has passed since the internal combustion engine was started is used as the standard for executing the warm-up of the catalyst. By means of this, the drive power control is easily executed, and the costs can be reduced.

In the fifth aspect of the present invention, the controller corrects the command value of the torque of the engine, when warming up catalyst by retarding the ignition timing of the internal combustion engine, and when it is determined, based on the output from the comparison circuit, that the detection result from the remaining charge detector is below the remaining charge reference value or the value relating to the same By correcting the command value of the engine torque, the variation in the torque cased by the retardation can be suppressed, even when retarding the ignition timing to warm up the catalyst.

DETAILED DESCRIPTION OF THE INVENTION

Figure 1:
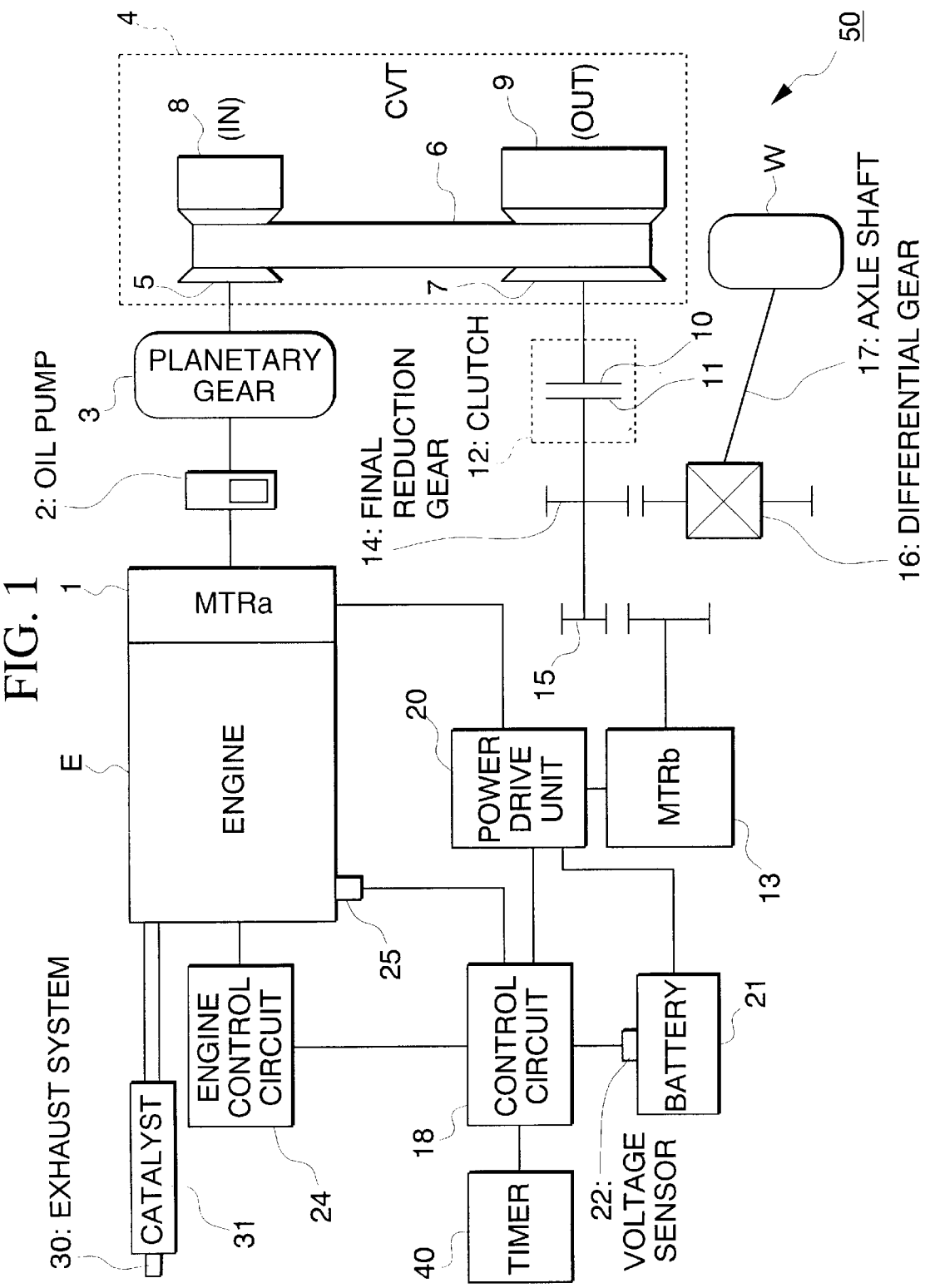
FIG. 1 is a block diagram showing the construction of the hybrid vehicle using the drive power control apparatus of the first embodiment of the present invention.

Hereinafter, the embodiments of the present invention are described with reference to the figures. FIG. 1 is a block diagram schematically showing the construction of the hybrid vehicle 50 of the first embodiment of the present invention. In this figure, the drive power from the engine E is input to a planetary gear 3 which switches between forward and reverse driving, via a submotor MTRa1 and an oil pump 2. The submotor MTRa1 receives the output from the engine E, generates electric energy, and outputs the generated electric energy to a power drive unit 20. The planetary gear 3 is mechanically connected to a selecting lever, not shown. When the driver switches the selecting lever, the rotational direction of the power from the engine E, which is input to a drive side pulley 5 of a CVT (Continuously Variable Transmission) 4, is switched.

The rotation of the drive side pulley 5 is transmitted via metal belt 6 to a driven side pulley 7. Here, the revolution ratio between the drive side pulley 5 and the driven side pulley 7 is determined by the winding diameter of each pulley with respect to the metal belt 6. This winding diameter is adjusted by moving the side chambers 8 and 9 of the pulleys by the applied force generated by oil pressure applied from the sides of the pulleys with respect to the direction of the rotational axes of the side chambers 8 and 9. This oil pressure is generated by the oil pump 2 driven by engine E and is supplied to the side chambers 8 and 9 via an oil pressure control apparatus.

The driven side pulley 7 is connected to the output axle of a main motor MTRb13 via a clutch 12 comprising a pair of engaging elements 10 and 11. A final reduction gear 14, and a gear 15 are connected between the clutch 12 and the main motor MTRb13. The drive power of the driven side pulley 7 is communicated to a differential gear 16 via the final reduction gear 14, and the transmitted drive power is further transmitted to vehicle axle 17, and the drive wheel W is made to rotate.

A control circuit 18 is connected with the oil pressure control apparatus, and is capable of detecting the oil pressure supplied to the side chambers 8 and 9 of CVT 4 via the oil pressure control apparatus. By means of this, the control circuit 18 is able to assess the transmission gear ratio of the CVT 4, and to control this.

Based on the detection result from a torque variation sensor 25, the control circuit 18 converts the torque from the engine E into a correction amount. Based on this calculated amount, the control circuit 18 calculates the drive power to be output from the main motor MTRb13, and outputs an MTRb drive power signal to the power drive unit 20.

Further, the control circuit 18 stores a voltage reference value corresponding to a remaining charge reference value of the battery 21, compares this voltage reference value with the detection result from a voltage sensor 22, and performs the control, depending on the comparison (the details will be explained below).

The voltage reference value is a threshold value for determining whether to charge the battery 21. The voltage reference value is compared with a detected charge voltage applied to the battery 21. When the detected voltage is low, it is determined that the remaining charge of the battery 21 is below the remaining charge reference value, and that the battery 21 must be charged. This voltage reference value has hysteresis: when the charge voltage is increasing, a high voltage reference value is used, and when the charge voltage is decreasing, a low voltage reference value is used. Here, although the charge voltage is substituted for the remaining charge of the battery 21, the remaining charge may be detected by integrating the electric current. The claims contain "a remaining charge or a value relating to the same", and "a remaining charge reference value or a value relating to the same" which include the charge voltage, and the voltage reference value.

Based on the control signal from the control circuit 18, the power drive unit 20 controls the rotations of the motors MTRa1 and MTRb13. The power drive unit 20 stores the electric energy, which is generated by the submotor MTRa1, to the battery 21, the battery 21 supplies the power to the main motor MTRb13, and the main motor MTRb13 is made to rotate.

The main motor MTRb13 is rotated by the power supplied from the power drive unit 20, the rotational power is transmitted via the gear 15, the final reduction gear 14, and the differential gear 16 to the vehicle axle 17, and the drive wheels W are made to rotate.

The voltage sensor 22 is provided in the battery 21, detects the charge voltage of the battery 21, and outputs detection results to the control circuit 18.

An engine control circuit 24 controls the ignition timing of the engine E and the amount of fuel to be injected. From the time of starting the engine E until a predetermined time has passed, or from the time of starting the engine E until the temperature of the water for cooling the engine reaches a predetermined value, the engine control circuit 24 retards the ignition timing by a predetermined angle (hereinafter referred to as retarding control). Reference numeral 25 denotes a torque variation sensor for detecting the crank angle at the time of ignition of the engine E and the engine speed of the engine E, and for outputting the detection results to the control circuit 18.

An exhaust system 30 discharges exhaust gas from the engine E into the atmosphere. A catalyst 31 and a catalyst temperature sensor 32 are provided in the exhaust system 30. The exhaust gas discharged from the engine E undergoes a reduction-oxidation reaction in the catalyst 31, thereby cleaning the exhaust gas. The catalyst 31 is activated (warmed) by the heat in the exhaust gas and the heat arising in the reduction-oxidation reaction. Further, in the retarding control, burning exhaust gas components contained in the exhaust gas discharged from the engine E prompts the activation of the catalyst 31.

Figure 2:
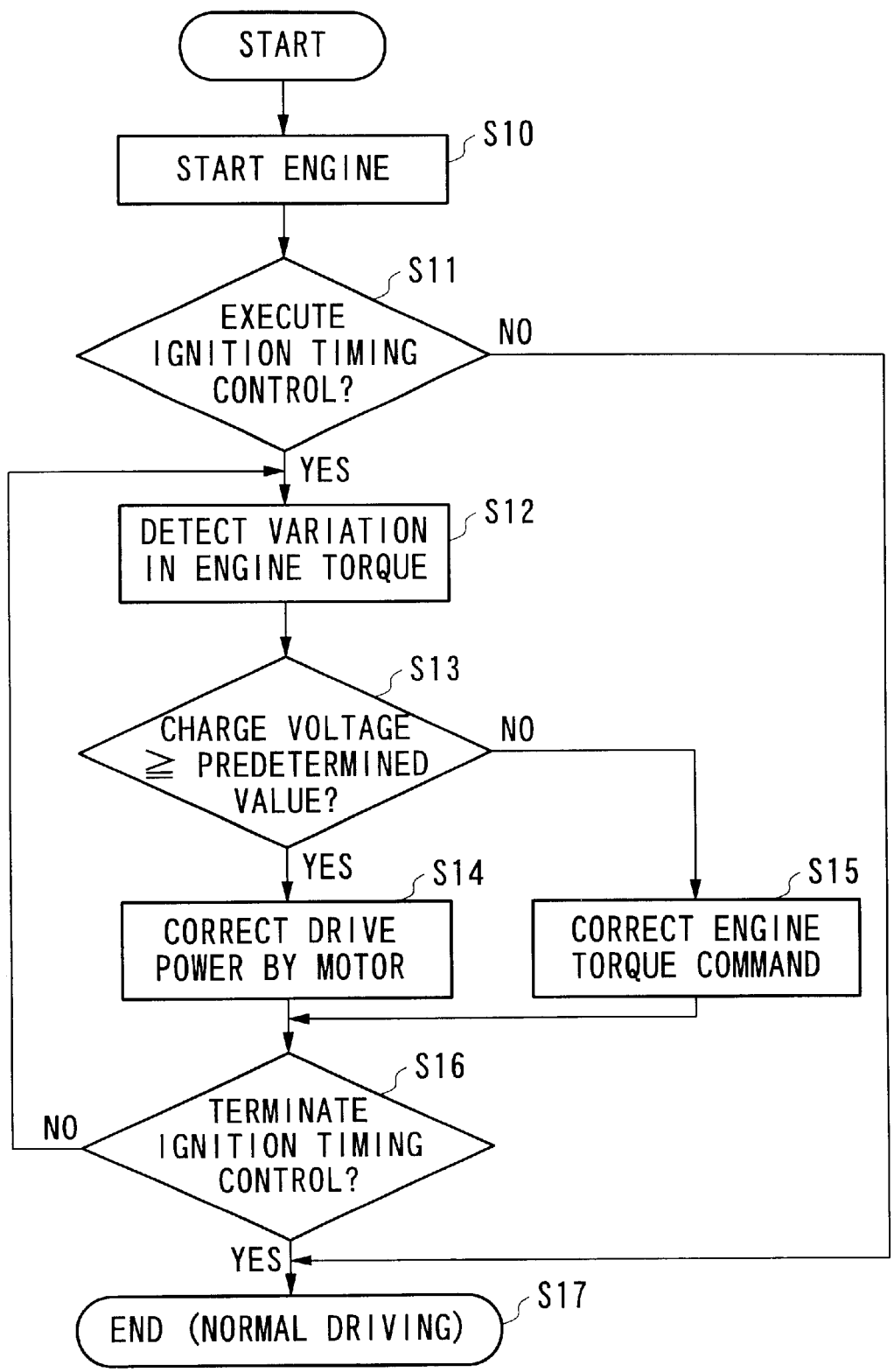
FIG. 2 is a flowchart for explaining the operation of the hybrid vehicle shown in FIG. 1.

The operation of the power drive controller for the hybrid vehicle 50 will be explained with reference to the flowchart of FIG. 2. After the time of starting the engine E (step S10), the control circuit 18 detects whether the engine control circuit 24 performs the retarding control (ignition timing control) (in step S11). When the retarding control is not conducted, the control circuit 18 terminates the drive power control (step S17).

When the retarding control is conducted (step S11), the torque variation sensor 25 detects the crank angle of the engine E and the engine speed (step S12), and outputs the detection results to the control circuit 18. The voltage sensor 22 detects the charge voltage of the battery 21, and outputs the detection result to the control circuit 18. The control circuit 18 compares the detection result output from the voltage sensor 22 with the stored voltage reference value (step S13).

When the detection result from the voltage sensor 22 is equal to or above the voltage reference value, the control circuit 18 calculates the crank angle at the time of ignition of the engine E and the engine speed, which have been varied by the retarding control, based on the result output from the torque variation sensor 25. Depending on the calculated value, the control circuit 18 calculates the amount to be output from the main motor MTRb13, and supplies the MTRb drive signal to the power drive unit 20.

On reception of the MTRb drive signal, the power drive unit 20 drives the main motor MTRb13, depending this signal (step S15). By driving the main motor MTRb13, the rotational power is transmitted via the gear 15, the final reduction gear 14, and the differential gear 16 to the vehicle axle 17. By means of this, the drive power from the main motor MTRb13 is added to the rotating wheels W driven by the engine E, so that the variations in torque are corrected in the retarding control.

Next, the control circuit 18 determines whether the engine control circuit 24 is performing the retarding control (ignition timing control) (step S16). When the retarding control is not being performed, the drive power control terminates (step S17). When the retarding control is being performed, the flow returns to step S12.

On the other hand, when the detection result from the voltage sensor is below the voltage reference value, the control circuit 18 corrects the engine torque command. That is, the control circuit 18 sends a signal for changing the combustion conditions of the engine E, to an engine control circuit 24. On reception of this signal, the engine control circuit 24 changes the amount of fuel to be injected and the ignition timing to compensate for the decrease in the torque due to the retarding control (step S16). Thus, the variations in torque in the retarding control are corrected.

Next, the control circuit 18 determines whether the engine control circuit 24 is performing the retarding control (step S16). When the retarding control is not being performed, the drive power control terminates (step S17). When the retarding control is being performed, the flow returns to step S12, and the above-described operation is repeated.

To simplify the above-described embodiment, a timer 40 for counting a preset time may be provided, and the drive power control may be performed after the time of starting the engine until the timer 40 finishes counting. That is, the elapsed time from the time of starting the engine may be used as the standard for determining whether to perform the drive power control.

Figure 3:
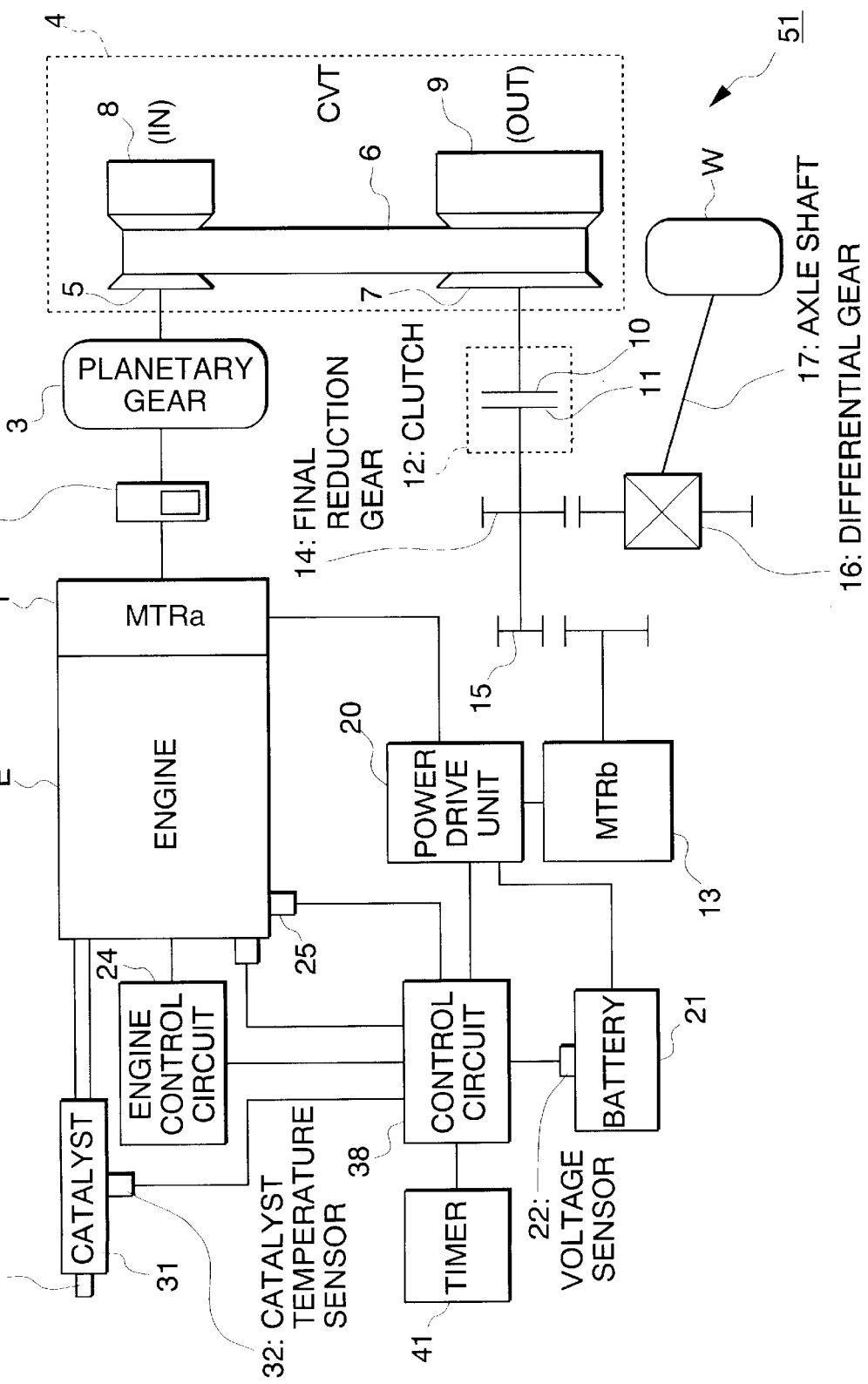
FIG. 3 is a block diagram showing the construction of the hybrid vehicle using the drive power control apparatus of the second embodiment of the present invention.

FIG. 3 is a block diagram showing the construction of the second embodiment of the present invention. In FIG. 3, the same reference numbers are employed to designate like parts shown in FIG. 1, and a detailed description is omitted.

As compared with the control circuit 18 in FIG. 1, the control circuit 38 in FIG. 3, in addition, stores in advance a water temperature reference value, and a catalyst temperature reference value, compares the detection results from the water temperature sensor 23 and the catalyst temperature sensor 32 with these reference values, and performs the control depending on the results of the comparisons (the details will be described below).

The water temperature reference value and the catalyst temperature reference value will be explained. The water temperature reference value is a threshold value for determining whether the warm-up of the engine is completed, based on the temperature of the cooling water in the engine E. When the detected temperature of the cooling water is above the temperature reference value, it is determined that the engine is warmed up. When below the temperature reference value, it is determined that the engine is cold (is required to be warmed up). When the warm-up of the engine is completed, it can be determined that the catalyst 31 is fully warmed up, and is activated. While the engine is being warmed up, the catalyst 31 is also warmed up by the exhaust gas discharged from the engine E, and the exhaust gas undergoes reduction-oxidation reaction on the catalyst 31 so that the temperature of the catalyst 31 rises and the catalyst 31 cleans the exhaust gas.

The catalyst temperature reference value is a threshold value for determining whether the catalyst 31 is activated. When the detected temperature of the catalyst is above the catalyst temperature reference value, it is determined that the catalyst is activated. The water temperature sensor 23 detects the temperature of the cooling water for cooling the engine E, and outputs the detection results to the control circuit 38. The catalyst temperature sensor 32 detects the temperature of the catalyst 31, and outputs the detection results to the control circuit 38.

Figure 4:
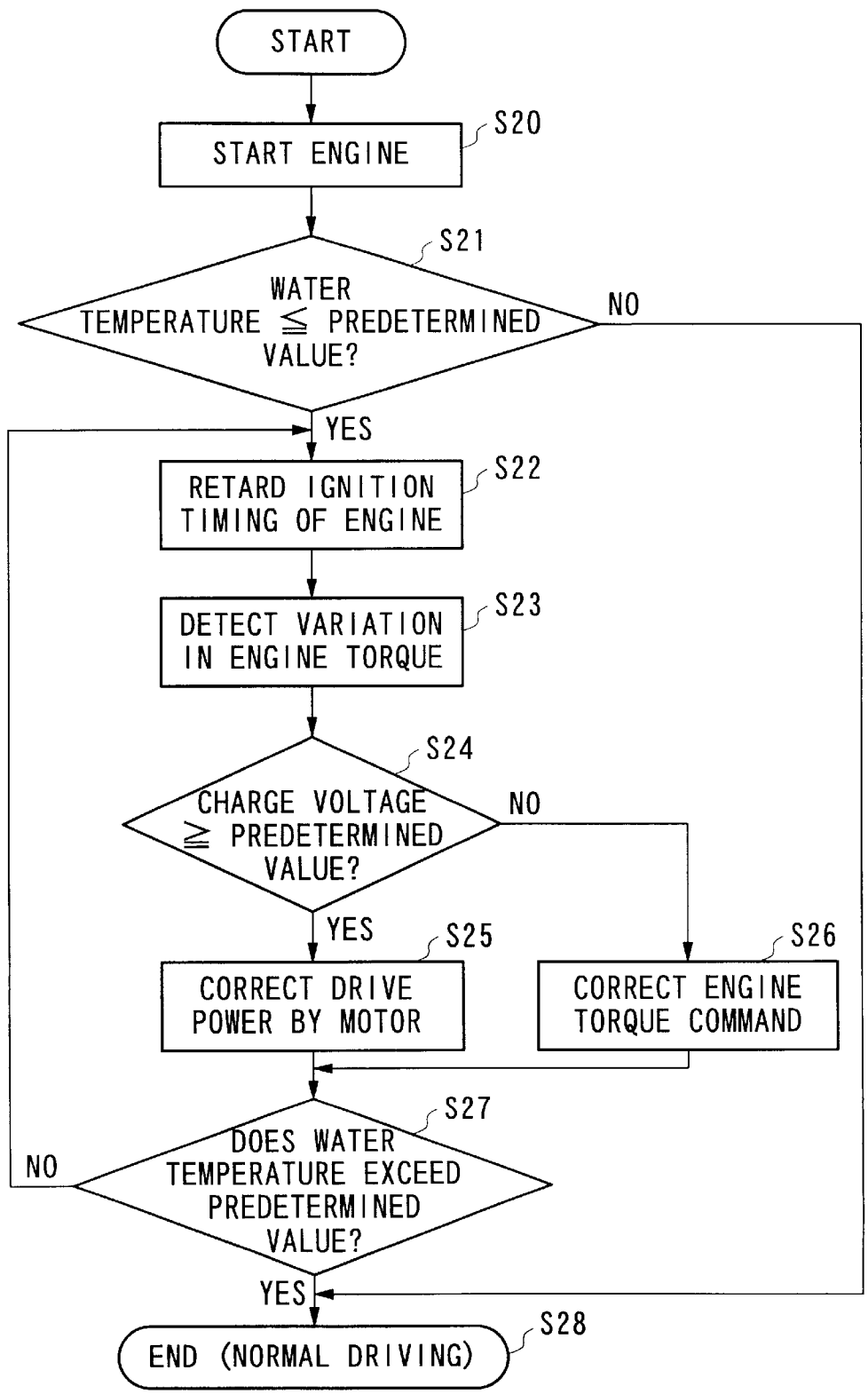
FIG. 4 is a flowchart for explaining the operation of the hybrid vehicle shown in FIG. 3.

The operation of the drive power control apparatus in the hybrid vehicle 51 according to the construction shown in FIG. 3 will be explained with the flowchart of FIG. 4. First, the engine E is started (step S20), the water temperature sensor 23 detects the temperature of the cooling water, and outputs the detection result to the control circuit 38. The control circuit 38 receives the detection result from the water temperature sensor 23, and compares it with the water temperature reference value which has been stored in advance (step S21). When the temperature of the cooling water is above the water temperature reference value (step S21), the control circuit 38 terminates the drive power control (step S28).

On the other hand, when the temperature of the cooling water is equal to or below the water temperature reference value (step S21), the control circuit 38 sends a signal for performing the retarding control, to the engine control circuit 24 (step S22). On reception of this signal, the engine control circuit 24 performs the retarding control.

Next, the torque variation sensor 25 detects the crank angle of the engine E and the engine speed, and outputs them to the control circuit 38 (step S23). Further, the voltage sensor 22 detects the charge voltage of the battery 21, and outputs the detection result to the control circuit 38. After that, the operation from step S24 to step S26 is performed in a manner similar to that from step S13 to step S15 in FIG. 2.

After step S25 or S26, the water temperature sensor 23 detects the temperature of the cooling water, and the control circuit 38 compares the detection result with the water temperature reference value. When the detection result is equal to or below the water temperature reference value, the flow returns to step S22, and the above-described operation is repeated.

On the other hand, when the detection result is above the water temperature reference value, the control circuit 38 terminates the drive power control (step S28).

While the above embodiment detects the temperature of the cooling water by the water temperature sensor 23, the catalyst temperature sensor 32 for detecting the temperature of the catalyst 31 may be substituted for the water temperature sensor 23, the output from the catalyst temperature sensor 32 may be directly connected to the input terminal, and the control circuit 38 may compare it with the catalyst temperature reference value. Thus, the temperature of the catalyst 31 can be directly detected, and it can be determined whether the catalyst 31 is activated. In this case, when the catalyst is not activated, the catalyst 31 can be warmed up according to the procedure of steps S22 to S28.

While in the construction shown in FIG. 3 the temperature of the catalyst is detected by the water temperature sensor 23, and the catalyst temperature sensor 32, devices other than the temperature sensor 23 and the catalyst sensor 32 may be employed as long as the temperature of the catalyst is reflected in the value which is measured. For example, as a simple method, a timer 41 for counting a preset time may be provided, and the drive power control may be performed from the time of starting the engine until the timer 41 has counted to the preset time. The preset time from the time of starting the engine may be used as the standard for determining the temperature of the catalyst. After the preset time has passed, the water temperature sensor 23, or the catalyst temperature sensor may output that the detection result is greater than the reference value to terminate the drive power control.

Although in the first and second embodiments the submotor MTRa1 is directly connected to the engine E, the submotor may be connected by a ratio gear.

To charge the battery 21, the main motor MTRb13 may generate electric energy from the rotation transmitted via the gear 15, and the generated energy may be charged to the battery 21 via the power drive unit 20. Further, the battery 21 may drive the submotor MTRa1, and may compensate for variations in the torque of the engine E.

In the first aspect of the present invention, when retarding the ignition timing of the internal combustion engine to warm up the catalyst, the remaining charge of the power storage unit or a value relating to the same is detected, and variations in the torque of the internal combustion engine caused by the retardation of the ignition timing are detected. When the detection result is equal to or above the remaining charge reference value or the value relating to the same, the torque which varies because of the retardation of the ignition timing is detected. Based on the variation in the torque from the internal combustion engine, the amount to be output from the motor is calculated. Because the motor is driven based on this calculated amount, the variations in torque from the internal combustion engine due to the retardation of the ignition timing can be compensated for. Thus, the variation in the torque can be suppressed, and smooth driving can be achieved. Further, the torque can be compensated for without increasing the supplied fuel amount.

In the second aspect of the present invention, the drive power control is performed within a predetermined period from the time of starting the internal combustion engine. Therefore, the drive power control is easily executed, and the costs can be reduced.

In the third aspect of the present invention, the catalyst temperature is detected. When the data relating to the catalyst temperature is equal to or below the reference value, the retarding control is performed. The torque which varies because of the retarding control is detected by the torque variation sensor. Based on this detection result, the amount of compensation for the variation in the torque of the internal combustion engine by the motor is calculated. The motor is driven, based on this calculated amount of compensation. That is, the data relating to the catalyst temperature is detected, the retarding control is performed when the catalyst is not activated, and the variations in torque of the internal combustion engine due to the retarding control is compensated for without an increase of the fuel consumption.

In the fourth aspect of the present invention, the retarding control is performed to warm up the catalyst within the predetermined period of time after the time of starting the internal combustion engine. It is therefore unnecessary to detect the temperature of the catalyst, and the variation in torque of the internal combustion engine due to the retarding control is compensated for while warming up the catalyst.

In the fifth aspect of the present invention, by correcting the command value of the engine torque, variations in the torque caused by the retarding control can be suppressed, even when retarding the ignition timing to warm up the catalyst.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A drive power control apparatus for a hybrid vehicle having an internal combustion engine, a power storage unit for storing electric power, and a motor driven by the electric power stored in the power storage unit, the hybrid vehicle being driven by at least one of the outputs from the internal combustion engine and the motor, the drive power control apparatus comprising:

a detector for detecting a variation in torque produced by the internal combustion engine;

a converter for converting the variation into an output from the motor, based on the detection result of the detector;

a remaining charge detector for detecting a remaining charge of the power storage unit or a value relating to the same;

a comparison circuit for comparing the detection result from the remaining charge detector with a preset remaining charge reference value or a value relating to the same; and a controller for driving the motor, based on the output from the converter, when warming up a catalyst by retarding the ignition timing of the internal combustion engine, and when it is determined, based on the output from the comparison circuit, that the detection result from the remaining charge detector is equal to or above the remaining charge reference value or the value relating to the same.

2. A power drive control apparatus for a hybrid vehicle according to claim 1 wherein the control by the controller is performed until a preset time has passed, when warming up the catalyst by retarding the ignition timing of the internal combustion engine.

3. A drive power control apparatus for a hybrid vehicle having an internal combustion engine, a power storage unit for storing electric power, and a motor driven by the electric power stored in the power storage unit, the hybrid vehicle being driven by at least one of the outputs from the internal combustion engine and the motor, the drive power control apparatus comprising:

a detector for detecting a variation in torque produced by the internal combustion engine;

a converter for converting the variation into an output from the motor, based on the detection result of the detector;

a remaining charge detector for detecting a remaining charge of the power storage unit or a value relating to the same;

a first comparison circuit for comparing the detection result from the remaining charge detector with a preset remaining charge reference value or a value relating to the same;

a data detector for detecting data corresponding to a temperature of catalyst;

a second comparison circuit for comparing the detection result from the data detector with a preset reference value; and a controller for driving the motor, based on the output from the converter, when warming up a catalyst by retarding the ignition timing of the internal combustion engine, when it is determined, based on the output from the comparison circuit, that the detection result from the remaining charge detector is equal to or above the remaining charge reference value or the value relating to the same, and when the detection result from the data detector is equal to or below the reference value.

4. A power drive control apparatus for a hybrid vehicle according to claim 3 wherein the data detector counts a preset time, and outputs that the detection result is greater than the reference value.

5. A power drive control apparatus for a hybrid vehicle according to claim 1, wherein the controller corrects a command value of the torque of the engine, when warming up the catalyst by retarding the ignition timing of the internal combustion engine, and when it is determined, based on the output from the comparison circuit, that the detection result from the remaining charge detector is below the remaining charge reference value or the value relating to the same.

6. A power drive control apparatus for a hybrid vehicle according to claim 3, wherein the controller corrects a command value of the torque of the engine, when warming up the catalyst by retarding the ignition timing of the internal combustion engine, and when it is determined, based on the output from the comparison circuit, that the detection result from the remaining charge detector is below the remaining charge reference value or the value relating to the same.

* * * * *